United States Patent
Armaroli et al.

(10) Patent No.: US 7,304,529 B2
(45) Date of Patent: Dec. 4, 2007

(54) METHOD OF CONTROLLING A CHARGE PUMP GENERATOR AND A RELATED CHARGE PUMP GENERATOR

(75) Inventors: Diego Armaroli, Mortara (IT); Davide Betta, Casalpusterlengo (IT); Marco Ferrari, Voghera (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 65 days.

(21) Appl. No.: 11/159,976

(22) Filed: Jun. 23, 2005

(65) Prior Publication Data

US 2006/0001474 A1 Jan. 5, 2006

(30) Foreign Application Priority Data

Jun. 25, 2004 (IT) .......................... VA2004A0026

(51) Int. Cl.
*H02M 3/18* (2006.01)
*G05F 1/56* (2006.01)
(52) U.S. Cl. ........................................ 327/536; 363/59
(58) Field of Classification Search ...................... None
See application file for complete search history.

(56) References Cited

U.S. PATENT DOCUMENTS

| | | | | |
|---|---|---|---|---|
| 6,226,194 | B1 * | 5/2001 | Bayer et al. | 363/60 |
| 6,392,904 | B1 * | 5/2002 | Bayer et al. | 363/59 |
| 6,411,531 | B1 * | 6/2002 | Nork et al. | 363/60 |
| 7,075,356 | B2 * | 7/2006 | Mayama et al. | 327/536 |
| 2005/0104651 | A1 * | 5/2005 | Hashimoto | 327/536 |

* cited by examiner

*Primary Examiner*—Kenneth B. Wells
*Assistant Examiner*—Terry L. Englund
(74) *Attorney, Agent, or Firm*—Lisa K. Jorgenson; Allen, Dyer, Doppelt, Milbrath & Gilchrist, P.A.

(57) ABSTRACT

The method controls a charge pump generator having at least an output tank capacitor on which a regulated output voltage of the generator is produced, and a pump capacitor that is connected to a supply node and to ground during charge phases and is coupled in an anti-parallel configuration to the output tank capacitor during charge transfer phases, alternated to the charge phases. The method limits the current absorbed from the supply because the transfer capacitor is charged during at least an initial charge phase with a constant charge current of a pre-established value.

12 Claims, 2 Drawing Sheets

METHOD OF CONTROLLING A CHARGE PUMP GENERATOR AND A RELATED CHARGE PUMP GENERATOR

FIELD OF THE INVENTION

The present invention relates to charge pump generators and, more particularly, to controlling a charge pump generator such that the transfer capacitor of the charge pump is not subjected to high current peaks at start-up.

BACKGROUND OF THE INVENTION

Charge pump voltage generators are largely used in many integrated circuits for generating a regulated voltage often of opposite sign to the supply voltage and that is maintained substantially constant as the current absorbed by the load circuit varies. An example of a common charge pump voltage generator is shown in FIG. 1. The circuit of FIG. 1 has operating phases in which the pump capacitor $C_P$ is charged at a certain supply voltage VDD, alternated with operating phases in which the pump capacitor $C_P$ is coupled in anti-parallel to the charge tank capacitor $C_T$, that supplies the electronic circuit with a voltage $V_{NEG}$ of opposite sign in respect to the charge voltage VDD. As long as the voltage $V_{NEG}$ is smaller than the voltage $V_{REF}$, the pump capacitor $C_P$ remains coupled to the supply voltage VDD. When the voltage $V_{NEG}$ exceeds the reference voltage $V_{REF}$, the capacitor $C_P$ charges the tank capacitor $C_T$ when the clock signal CK assumes a logic active value, and is charged again at the supply VDD voltage when the clock signal CK becomes a logic null value.

In practice, this loop controls the duty cycle at a constant frequency when the charge current is above a certain threshold that depends on the supply voltage, on the on-resistances $R_{ON}$ of the switches SW1 and SW2, on the pump capacitance $C_P$ and on the delay of the feedback line formed by the comparator and by the logic gates. The start-up phase of this charge pump generator is critical because the power supply must deliver currents of large peak value. Indeed, at the start-up, the capacitor $C_P$ is completely discharged and the current that flows in the supply lines has a peak value $I_{PEAK}$ given by the following equation:

$$I_{PEAK} = \frac{V_{DD}}{2 \cdot R_{ON}}$$

The on-resistance $R_{ON}$ of the switches is generally smaller than 1Ω, thus the current peak $I_{PEAK}$ may typically be larger than above 2A.

When the generator starts up, the tank capacitor $C_T$ may also be almost fully discharged, thus the pump capacitor $C_P$ will be discharged almost completely during initial charge transfer phases. As a consequence, when a charge phase starts, large current peaks are absorbed from the supply. Only when steady-state conditions are reached, that is when the voltage $V_{NEG}$ approximately equals the voltage $V_{REF}$, these current peaks will become of normal or acceptable magnitude.

SUMMARY OF THE INVENTION

The invention provides a start-up procedure of a charge pump generator and a related charge pump generator that overcomes the above discussed problem of excessively large current peaks at start-up.

According to the method of the present invention, during initial transfer phases, the pump capacitor is charged at a constant current of a pre-established value without connecting the capacitor through switches directly to ground and to the supply, as in known generators. Only when the regulated voltage reaches the desired reference voltage, the pump capacitor begins to be charged by directly connecting it through switches to ground and to the supply as in a conventional charge pump generator. In so doing, repeated large current peaks are not absorbed from the supply nodes at start-up.

More particularly, the invention provides a method of controlling a charge pump generator having at least an output tank capacitor on which a regulated output voltage of the generator is produced, and a pump capacitor that is connected to a supply node and to ground during charge phases and is coupled in an anti-parallel configuration to the output tank capacitor during charge transfer phases, alternated to the charge phases. The method of this invention limits the current absorbed from the supply because the transfer capacitor is charged during at least an initial charge phase with a constant charge current of a pre-established value.

This method is implemented in the charge pump generator of the invention. The charge current is delivered to the transfer capacitor by a current generator enabled by a respective enabling signal, generated by a control circuit.

BRIEF DESCRIPTION OF THE DRAWINGS

The invention will now be described by way of example with reference to the accompanying drawings, in which.

DETAILED DESCRIPTION OF THE PREFERRED EMBODIMENTS

Figure 1:
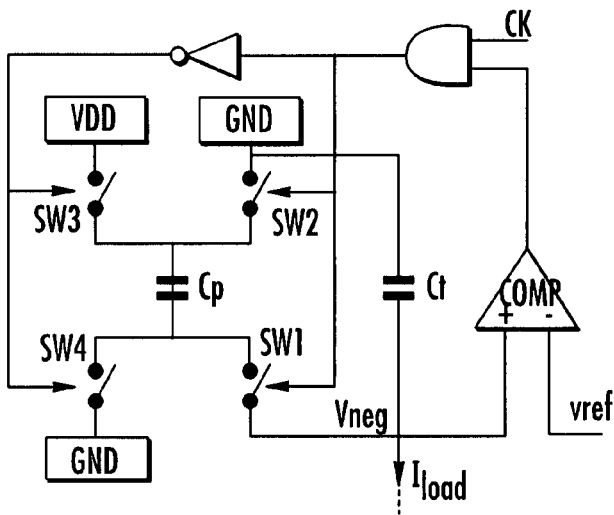
FIG. 1 is a schematic diagram of a charge pump voltage generator of the prior art.
Figure 2:
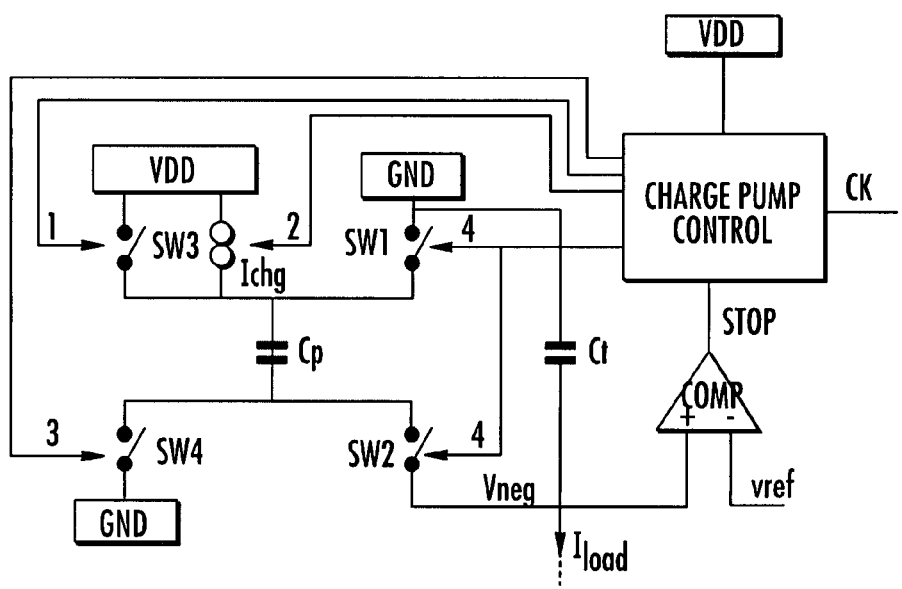
FIG. 2 is a schematic diagram illustrating a charge pump voltage generator of the present invention using a charge current generator enabled by a control circuit.

A preferred embodiment of a charge pump generator implementing the method of the invention is shown in FIG. 2. Differently from the known generator of FIG. 1, it comprises a current generator $I_{CHG}$ enabled by an enabling signal 2, and connected such as to charge the pump capacitor $C_P$, and a control circuit of the current generator CHARGE PUMP CONTROL. The control circuit drives the switches SW1 and SW2 in coincidence of the leading and trailing edges of the clock pulse CK. During start-up phases of the charge pump generator, the control circuit, instead of turning on the switch SW3, charges the pump capacitor $C_P$ by enabling the controlled current generator $I_{CHG}$.

Therefore, during initial charging phase at start-up, the current that is absorbed from the supply is limited to the value $I_{CHG}$:

$$I_{PEAK} = I_{CHG}$$

Differently from the voltage generator of FIG. 1, in the charge pump generator of the invention, the risk of forcing through the supply excessively large current peaks at start-up is reduced and/or eliminated.

When the absolute value of the regulated voltage $V_{NEG}$ exceeds the reference voltage $V_{REF}$, the comparison flag STOP switches to null. This means that the generator has reached a steady-state functioning condition and therefore the pump capacitor $C_P$ may be charged by coupling it directly to the supply line VDD. Of course, once this condition is reached, the controlled current generator $I_{CHG}$ is isolated.

Figure 3:
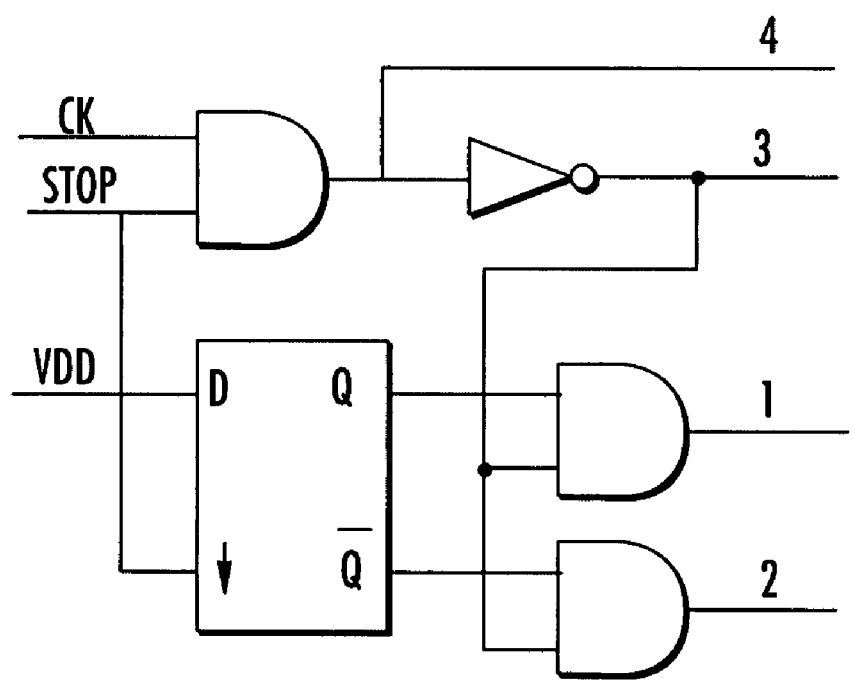
FIG. 3 is a schematic diagram illustrating a preferred embodiment of the control circuit of the charge pump voltage generator of FIG. 2.

A preferred embodiment of the control circuit CHARGE PUMP CONTROL is depicted in FIG. 3. As long as the flag STOP has an active logic value because the absolute value of the voltage $V_{NEG}$ is smaller than the reference voltage $V_{REF}$, the D-type flip-flop generates a null output Q, thus the enabling signal 1 is null while the enabling signal 2 switches active at the same instant of the enabling signal 3, every time the clock CK switches to null. In this condition, the pump capacitor $C_P$ is charged by the controlled current generator $I_{CHG}$.

When the absolute value of the regulated voltage $V_{NEG}$ exceeds the voltage $V_{REF}$, the start-up of the charge pump generator has terminated, and the comparison flag STOP switches null. The D-type flip-flop samples the supply voltage VDD, corresponding to a logically active value, in correspondence of the first trailing edge of the flag STOP. The enabling signal 2 will be null while the signal 1 will switch active together with the signal 3.

As a consequence, from the end of the start-up onwards, the generator of FIG. 2 operates like the conventional charge pump generator of FIG. 1.

What is claimed is:

1. A method of controlling a charge pump voltage generator having an output tank capacitor on which a regulated voltage is produced, and a pump capacitor, the method comprising:
    connecting the pump capacitor between a supply voltage and a reference voltage during charge phases;
    connecting the pump capacitor in anti-parallel to the output tank capacitor during charge transfer phases alternated with the charge phases; and
    charging only the pump capacitor during a first charge phase at startup with a constant charge current, and charging the pump capacitor with a non-constant charge current in subsequent phases.

2. The method of claim 1, further comprising:
    comparing the regulated voltage with a pre-established threshold; and
    interrupting the first charge phase by isolating the pump capacitor from at least the supply voltage and the output tank capacitor when the regulated voltage exceeds the pre-established threshold during the first charge phase.

3. The method of claim 2, further comprising connecting the pump capacitor between the supply voltage and the reference voltage during a second charge phase successive to the first charge phase in which the regulated voltage exceeded the pre-established threshold.

4. The method of claim 3, further comprising:
    beginning the second charge phase when the regulated voltage exceeds the pre-established threshold and a clock signal of the charge pump generator switches to a null logic value; and
    beginning a first charge transfer phase when the regulated voltage exceeds the pre-established threshold and the clock signal switches to an active logic value.

5. A method of controlling a charge pump voltage generator having a regulated voltage output capacitor and a transfer capacitor, the method comprising:
    charging only the transfer capacitor during a first charge phase with a constant charge current, and charging the transfer capacitor with a non-constant charge current in subsequent phases;
    connecting the transfer capacitor between a supply voltage and a reference voltage during at least a second charge phase; and
    connecting the transfer capacitor to the regulated voltage output capacitor during charge transfer phases.

6. The method of claim 5, wherein charging the transfer capacitor during the first charge phase with the constant charge current comprises operating a current generator connected between the transfer capacitor and the supply voltage.

7. The method of claim 5, further comprising:
    comparing a regulated voltage from the regulated voltage output capacitor with a pre-established threshold; and
    interrupting the first charge phase by isolating the transfer capacitor from the regulated voltage output capacitor when the regulated voltage exceeds the pre-established threshold during the first charge phases 8. The method of claim 7, further comprising connecting the transfer capacitor between the supply voltage and the reference voltage during the second charge phase successive to the first charge phase in which the regulated voltage exceeded the pre-established threshold.

9. The method of claim 8, further comprising selectively enabling charge phases and charge transfer phases based upon the regulated voltage, the pre-established threshold and a clock signal.

10. A charge pump voltage generator comprising:
    an output tank capacitor on which a regulated voltage of the generator is produced;
    a pump capacitor connected between a supply voltage and a reference voltage during charge phases, and connected in anti-parallel to the output tank capacitor during charge transfer phases alternated with charge phases, timed by a clock signal;
    a plurality of switches respectively connecting the pump capacitor to the supply voltage and to the reference voltage, and in anti-parallel to the output tank capacitor;
    a control circuit generating control signals for the plurality of switches; and
    a current generator controlled by a first enabling signal and connected between the supply voltage and the pump capacitor;
    the control circuit driving the switches and generating the first enabling signal to
        connect the pump capacitor between the supply voltage and the reference voltage during the charge phases,
        connect the pump capacitor in anti-parallel to the output tank capacitor during the charge transfer phases, and
        charge the pump capacitor during at least a first start-up charge phase with a constant charge current from the current generator.

11. The charge pump voltage generator of claim 10, further comprising:
    a comparator to compare the regulated voltage with a threshold voltage and generate a comparison signal when the regulated voltage exceeds the threshold voltage;
    the control circuit generating
        the first enabling signal for the current generator when the comparison signal is active and has not switched to a null logic state from a start-up of the generator,
        a second enabling signal for the switches connecting the pump capacitor in anti-parallel to the output tank capacitor when the comparison signal and the clock signal are active, a third enabling signal for the switch connecting the pump capacitor to the supply voltage, and active when the comparison signal has switched at least once from the start-up of the generator and at least one of the clock signal and comparison signal is in the null logical state, and a fourth enabling signal of the switch connecting the pump capacitor to the reference voltage when at least one of the clock signal and comparison signal is in the null logical state.

12. The charge pump voltage generator of claim 11, wherein said control circuit comprises;

a D-type flip-flop for sampling the supply voltage on a trailing edge of the comparison signal, and generating an output signal having the null logic value before a first trailing edge of the comparison signal;

a first logic AND gate input with the comparison signal and clock signal for generating the second enabling signal;

a logic NOT gate for generating the fourth enabling signal as an inversion of the second enabling signal;

a second logic AND gate input with the fourth enabling signal and the output signal, and for generating the third enabling signal; and a third logic AND gate input with the fourth enabling signal and an inversion of the output signal, and for generating the first enabling signal.

\* \* \* \* \*

UNITED STATES PATENT AND TRADEMARK OFFICE
CERTIFICATE OF CORRECTION

PATENT NO. : 7,304,529 B2
APPLICATION NO. : 11/159976
DATED : December 4, 2007
INVENTOR(S) : Armaroli et al.

It is certified that error appears in the above-identified patent and that said Letters Patent is hereby corrected as shown below:

|  |  |
|---|---|
| Column 4, Line 19 | Delete : "phases"<br>Insert: -- phases. -- |
| Column 5, Line 12 | Delete: "comprises;"<br>Insert: -- comprises: -- |

Signed and Sealed this

Fifth Day of August, 2008

JON W. DUDAS
*Director of the United States Patent and Trademark Office*